(12) United States Patent
Iizuka

(10) Patent No.: US 7,912,876 B2
(45) Date of Patent: Mar. 22, 2011

(54) DATA PROCESSING APPARATUS, DATA PROCESSING METHOD, AND COMPUTER PROGRAM

(75) Inventor: Ken Iizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 420 days.

(21) Appl. No.: 11/971,647

(22) Filed: Jan. 9, 2008

(65) Prior Publication Data

US 2008/0222204 A1 Sep. 11, 2008

(30) Foreign Application Priority Data

Jan. 16, 2007 (JP) ................................ P2007-006880

(51) Int. Cl.
*G06F 17/00* (2006.01)
(52) U.S. Cl. ......... 707/809; 707/793; 707/810; 707/812
(58) Field of Classification Search .................. 707/793, 707/809, 810, 812
See application file for complete search history.

(56) References Cited

U.S. PATENT DOCUMENTS

2008/0184084 A1* 7/2008 Matsumoto .................. 714/728

* cited by examiner

*Primary Examiner* — Sana Al-Hashemi
(74) *Attorney, Agent, or Firm* — Finnegan, Henderson, Farabow, Garrett & Dunner, L.L.P.

(57) ABSTRACT

A data processing apparatus includes an input section configured to receive data to be encoded, a first pseudo-random-number generating section configured to generate a first pseudo-random number, a second pseudo-random-number generating section configured to a second pseudo-random number, an address determining section configured to determine matrix address candidate values on the basis of a bit string of the second pseudo-random number generated by the second pseudo-random-number generating section, a matrix generating section configured to generate a matrix in which pixel values based on constituent bit values of the first pseudo-random number generated by the first pseudo-random-number generating section are set at matrix positions designated on the basis of the matrix address candidate values, and an encoding section configured to generate encoded data by executing exclusive OR operations between corresponding positional data in the matrix generated by the matrix generating section and the received data.

16 Claims, 14 Drawing Sheets

ENCODED RESULT DATA

MATRIX DATA

INPUT DATA

FIG. 7A
INPUT DATA
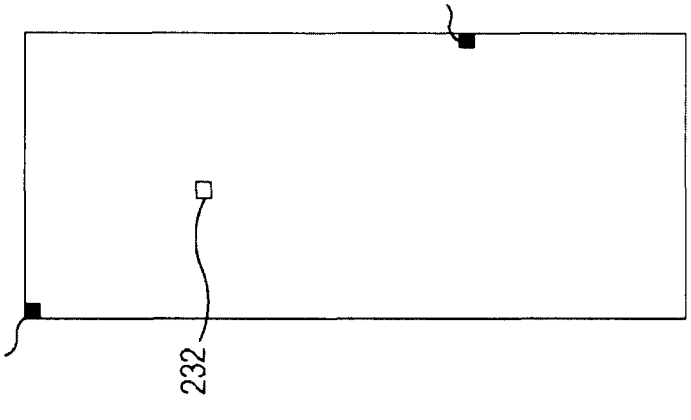
160 PIXELS
60 PIXELS
FIG. 7B
MATRIX DATA
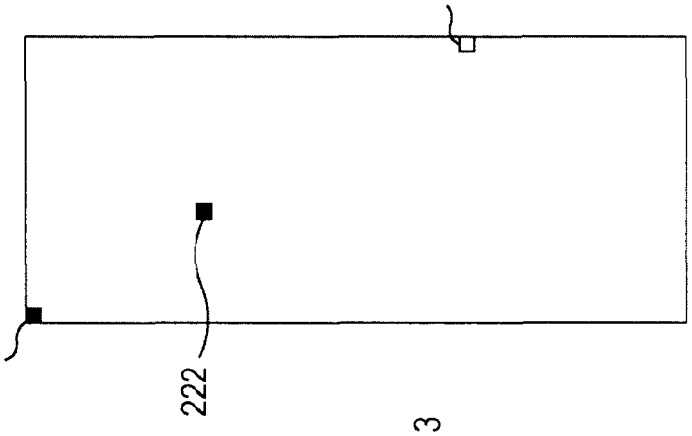
FIG. 7C
ENCODED RESULT DATA
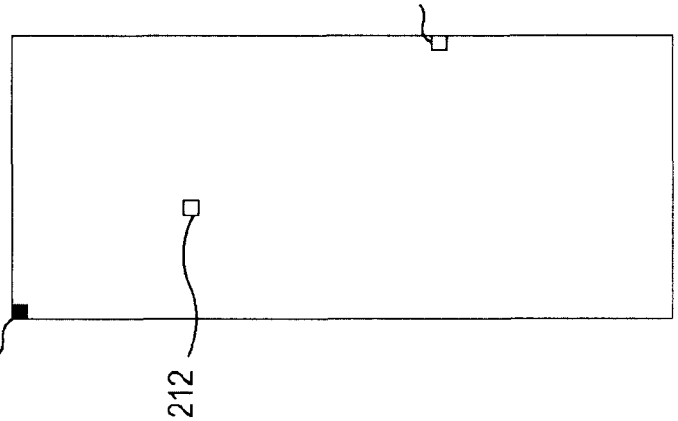

DATA PROCESSING APPARATUS, DATA PROCESSING METHOD, AND COMPUTER PROGRAM

CROSS REFERENCES TO RELATED APPLICATIONS

The present invention contains subject matter related to Japanese Patent Application JP 2007-006880 filed in the Japanese Patent Office on Jan. 16, 2007, the entire contents of which are incorporated herein by reference.

BACKGROUND OF THE INVENTION

1. Field of the Invention

The present invention relates to data processing apparatuses, data processing methods, and programs used therewith. In particular, the present invention relates to a data processing apparatus, data processing method, and program for executing encryption and obfuscation of confidential data or the like such as a biometric information template.

2. Description of the Related Art

Recently, biometrics authentication technologies using biometric information such as fingerprints and vein patterns have attracted attention. A common biometrics authentication process is performed as processing of performing collation between a feature value (template) of biometric information registered in a biometrics authentication system beforehand and a feature value obtained from new biometric information that a user allows the biometrics authentication system to read. In such a biometrics authentication system, it is necessary to store data in a storage unit of the system in a secure form such as encrypting a template for preventing registered template information from leaking.

As a technique for preventing data leakage, there is a technique of obfuscation that involves changing original data in accordance with predetermined rules. For example, as a technique for obfuscating a bit string such as stream data, a technique for obfuscating data by using a PN (pseudo-random noise) sequence is known. A PN sequence can be generated by providing shift registers and a proper feedback tap.

The configuration of a system for recording confidential information in a database by using data obfuscation with a PN sequence is described with reference to FIG. 1. FIG. 1 shows an example of the configuration of an authentication system 10 that receives input biometric information such as a fingerprint or vein pattern, uses a PN sequence to encode (encrypt (obfuscate)) the data, and registers the encoded data in a database.

User fingerprint information or the like is input to the authentication system 10 through an input section 11. An encoding/decoding section 12 receives the data input from the input section 11 and PN sequence data from a PN sequence generating section 13, performs encoding on the basis of both data, and registers the encoded data in a database 14. At a collation time, the encoding/decoding section 12 acquires the encoded data registered in the database 14, executes decoding on the basis of the encoded data and the PN sequence generated by the PN sequence generating section 13, and outputs the decoded result to a collation section 15. The collation section 15 executes processing of collation between the decoded result and new data received through the input section 11.

The PN sequence generating section 13 shown in FIG. 1 generates a pseudo-random number. Part (1) of FIG. 2 shows a configuration example of shift registers and feedback tap for generating a PN sequence having a period of 7. Specifically, the PN sequence generating, section 13 includes three shift registers (indicated by SRa, SRb, and SRc) 21, 22, and 23, and an exclusive OR operation unit 24. A value of the shift register 21 is output to the shift register 22. A value of the shift register 22 is output to the shift register 23. A value of the shift register 23 is input to an exclusive OR operation unit 24. The exclusive OR operation unit 24 executes an exclusive OR operation between the input value and the value of the shift register 21, and inputs an operation result to the shift register 21. Data input and output between the shift registers are controlled on the basis of predetermined clock timing.

Part (2) of FIG. 2 shows changes in data stored in the three shift registers 21, 22, and 23. When the data in the registers 21, 22, and 23 are sequentially shifted, it is found that the original state is returned at a period of 7, as indicated by the shown bit arrangement. A PN sequence has a feature in that the data in the shift registers can take all states excluding a pattern of all zeroes. Thus, the period is represented by (two to the power of the number of stage is of shift registers)−1. In the case of FIG. 2, since the number of stages of shift registers is 3, the period is represented by $2^3-1=7$.

FIG. 3 illustrates examples of data encoding and decoding processes using a PN sequence. For example, in a case in which, in the authentication system 10, a feature value (template) is stored in the database 14, as described with reference to FIG. 1, the data from the input section 11 and the PN sequence data from the PN sequence generating section 13 are input, encoding (encryption (obfuscation)) on the basis of both data is performed, and the encoded data is registered in the database 14.

The encoding process shown in part (1) of FIG. 3 has: (1a) the data input from the input section 11 shown in FIG. 1, in which an input bit string serves as one to be encoded corresponding to, for example, a feature value of biometric information;

(1b) the PN sequence data, in which a PN sequence is input from the PN sequence generating section 13 shown in FIG. 1; and (1c) the encoded result, in which encoded data is generated by the encoding/decoding section 12 shown in FIG. 1 on the basis of the input bits and the PN sequence.

In the encoding process, the encoding/decoding section 12 obtains an encoded result by executing exclusive OR operations between an input bit string and a PN sequence. For example, the first bits of the input bit string and the PN sequence are 0 and 1. This is represented by

0(XOR)1=1 where (XOR) represents an exclusive OR operation.

The second bits of the input bit string and the PN sequence are 0 and 0. This is represented by the following equation.

0(XOR)0=0

Subsequently, by similarly executing exclusive OR operations between corresponding bits of the input bit string and the PN sequence, (1C) the encoded result is generated. The generated encoded result is stored in the database 14 shown in FIG. 1.

As described above, (1C) the encoded result has a completely different form from that of the original bit string, that is, (1a) the input bit string.

The decoding process shown in part (2) of FIG. 3 has:
(2a) an encoded bit string that is the encoded result stored in the database 14 shown in FIG. 1 and corresponds to (1c) the encoded result in FIG. 3;
(2b) a PN sequence that is the PN sequence data input from the PN sequence generating section 13 shown in FIG. 1; and (2c) a decoded result in which decoded data is generated by the encoding/decoding section 12 shown in FIG. 1 on the basis of (2a) the encoded bit string and (2b) the PN sequence.

Also in the decoding process, the encoding/decoding section 12 obtains the decoded result by executing exclusive OR operations between (2a) the encoded bit string and (2b) the PN sequence. The PN sequence used in encoding and that used in decoding are identical. As a result, (2c) the decoded result is identical to (1a) the input bit string, and it is found that the original bit string is reproduced.

The above-described encoding/decoding technique using a PN sequence is very easy to use since it has a relatively simplified configuration and is easily realized as hardware. However, if a bit arrangement in a certain length (specifically, double the number of stages of shift registers) of the bit string generated by the PN sequence is found, a feedback tap status can be presumed from the PN sequence information. Thus, there is a risk in which, by executing, in a round-robin manner, exclusive OR operations between the bit strings generated and encoded with the same PN sequence, the original bit string can be reproduced. This analysis technique is known as the "Berlekamp-Massey" algorithm.

As described above, although the data encrypting and obfuscating technique using a PN sequence has a merit in that it has a simplified configuration and it is easy to use, it has a weakness in security in that input data can be analyzed on the basis of a leak of PN sequence information.

SUMMARY OF THE INVENTION

The present invention is intended to solve, for example, the above problems. It is desirable to provide a data processing apparatus, a data processing method, and a computer program in which, in a configuration to which a data encrypting and obfuscating technique using a PN sequence is applied, difficulty of analyzing original data is enhanced.

According to a first embodiment of the present invention, there is provided a data processing apparatus including input means for receiving input data to be encoded, first pseudo-random-number generating means for generating a first pseudo-random number, second pseudo-random-number generating means for generating a second pseudo-random number, address determining means for determining matrix address candidate values on the basis of a bit string of the second pseudo-random number generated by the second pseudo-random-number generating means, matrix generating means for generating a matrix in which pixel values based on constituent bit values of the first pseudo-random number generated by the first pseudo-random-number generating means are set at matrix positions-designated on the basis of the matrix address candidate values, and encoding means for generating encoded data by executing exclusive OR operations between corresponding positional data in the matrix generated by the matrix generating means and the received input data.

In the first embodiment, the address determining means may execute processing in which, as a result of comparing each matrix address candidate value and a maximum address of the matrix generated by the matrix generating means, when the matrix address candidate value is not greater than the maximum address of the matrix, the matrix address candidate value is used as an address for use in matrix generation, and, when the matrix address candidate value is greater than the maximum address of the matrix, the matrix address candidate value is not used as an address for use in matrix generation.

In the first embodiment, when each matrix address candidate value is not greater than a maximum address of the matrix, the matrix generating means may set, at a designated position of the matrix address candidate value, one pixel value based-on one constituent bit value of the first pseudo-random number. When the matrix address candidate value is greater than the maximum address of the matrix, the matrix generating means may not use, for matrix generation, the pixel value based on the constituent bit value of the first pseudo-random number.

In the first embodiment, the address determining means may execute processing for sequentially determining the matrix address candidate values by sequentially shifting a bit string selected from the bit string of the second pseudo-random number generated by the second pseudo-random-number generating: means, and the matrix generating means may execute processing in which the constituent bit values of the first pseudo-random number are selected so as to correspond to the matrix address candidate values determined by the address determining means, while sequentially shifting the constituent bit values of the first pseudo-random number, and, when each matrix address candidate value is not greater than a maximum address of the matrix, a pixel value based on a bit value selected from the first pseudo-random number is set at a designated position of the matrix address candidate value.

In the first embodiment, the second pseudo-random-number generating means may generate a pseudo-random number having a period that is not less than the number of matrix addresses necessary for forming the matrix generated by the matrix generating means.

In the first embodiment, the first pseudo-random-number generating means and the second pseudo-random-number generating means may be pseudo-random noise-sequence generating means.

In the first embodiment, the data processing apparatus may further include decoding means for generating decoded data by executing exclusive OR operations between corresponding positional data in the matrix generated by the matrix generating means and the encoded data generated by the encoding means, and collation means for executing collation between the decoded data generated by the decoding means and received data from the input means.

According to a second embodiment of the present invention, there is provided a data processing method for a data processing apparatus, the data processing method including receiving input data to be encoded, generating a first pseudo-random number, generating a second pseudo-random number, determining matrix address candidate values on the basis of a bit string of the generated second pseudo-random number, generating a matrix in which pixel values based on constituent bit values of the generated first pseudo-random number are set at matrix positions designated on the basis of the matrix address candidate values, and generating encoded data by executing exclusive OR operations between corresponding positional data in the matrix generated by the matrix generating means and the received input data.

In the second embodiment, the step of determining the matrix address candidate values may include executing processing in which, as a result of comparing each matrix address candidate value and a maximum address of the matrix, when the matrix address candidate value is not greater than the maximum address of the matrix, the matrix address candidate value is used as an address for use in matrix generation, and when the matrix address candidate value is greater than the maximum address of the matrix, the matrix address candidate value is not used as an address for use in matrix generation.

In the second embodiment, in the step of generating the matrix, when each matrix address candidate value is not greater than a maximum address of the matrix, one pixel value based on one constituent bit value of the first pseudo-random number may be set at a designated position of the matrix address candidate value, and, when the matrix address candidate value is greater than the maximum address of the matrix, the pixel value based on the constituent bit value of the first pseudo-random number may not be used for matrix generation.

In the second embodiment, the step of determining the matrix address candidate values may include: executing processing for sequentially determining the matrix address candidate values by sequentially shifting a bit string selected from the bit string of the generated second pseudo-random number, and the step of generating the matrix may execute processing in which the constituent bit values of the first pseudo-random number are selected so as to correspond to the matrix address candidate values determined in the step of determining the matrix address candidate values, while sequentially shifting the constituent bit values of the first pseudo-random number, and, when each matrix address candidate value is not greater than a maximum address of the matrix, a pixel value based on a bit value selected from the first pseudo-random number is set at a designated position of the matrix address candidate value.

In the second embodiment, in the step of generating the second pseudo-random number, a pseudo-random number having a period that is not less than the number of matrix addresses necessary for forming the generated matrix may be generated.

In the second embodiment, in each of the step of generating the first pseudo-random number and the step of generating the second pseudo-random number, a pseudo-random noise sequence may be generated.

In the second embodiment, the data processing method may further include the steps of generating decoded data by executing exclusive OR operations between corresponding positional data in the generated matrix and the generated encoded data, and executing collation between the generated decoded data and received data.

According to a third embodiment of the present invention, there is provided a computer program for causing a data processing apparatus to execute data processing including the steps of receiving input data to be encoded, generating a first pseudo-random number, generating a second pseudo-random number, determining matrix address candidate values on the basis of a bit string of the second pseudo-random number, generating a matrix in which pixel values based on constituent bit values of the generated first pseudo-random number are set at matrix positions designated on the basis of the matrix address candidate values, and generating encoded data by executing exclusive OR operations between corresponding positional data in the generated matrix and the received input data.

The computer program according to the third embodiment of the present invention is a computer program that can be provided to a multipurpose computer system capable of executing, for example, various types of program code, by using a storage medium and a communication medium that are provided in computer-readable form, for example, a storage medium such as a compact disc, a floppy disk, or a magneto-optical disc, or a communication medium such as a network. By providing such a program in computer-readable form, processing according to the program is realized on the computer system.

Other features and advantages of the present invention will be apparent from a more detailed description based on the following embodiment and the accompanying drawings. In this specification, the system is a logical set of a plurality of apparatuses and is not limited to a case in which apparatuses having configurations are accommodated in the same housing.

In the configuration of an embodiment of the present invention, encoding and decoding processes using a matrix are executed. By using a matrix in which pieces of constituent bit information of a PN sequence generated by a PN sequence generating section are arranged at random in accordance with addresses determined from a PN sequence generated by a different PN sequence generating section, encoding and decoding processes are executed. According to this configuration, it is difficult to presume a PN sequence generating technique from a bit arrangement in the matrix, thus enabling secure data processing in which a possibility of data leakage is reduced. Instead of using, as matrix constituent data, all bit values of a first PN sequence, it is determined whether the bit values are used as matrix constituent data on the basis of address values of a second PN sequence. Thus, matrix constituent bit data is not equal to original PN sequence data. Accordingly, difficulty of analyzing an original PN sequence and difficulty of original data from encoded data are enhanced, thus realizing a high-security data processing system.

BRIEF DESCRIPTION OF THE DRAWINGS

FIGS. 7A, 7B, and 7C are illustrations showing an example of encoding of input data with matrix data by an encoding/decoding section;

DESCRIPTION OF THE PREFERRED EMBODIMENTS

Figure 1:
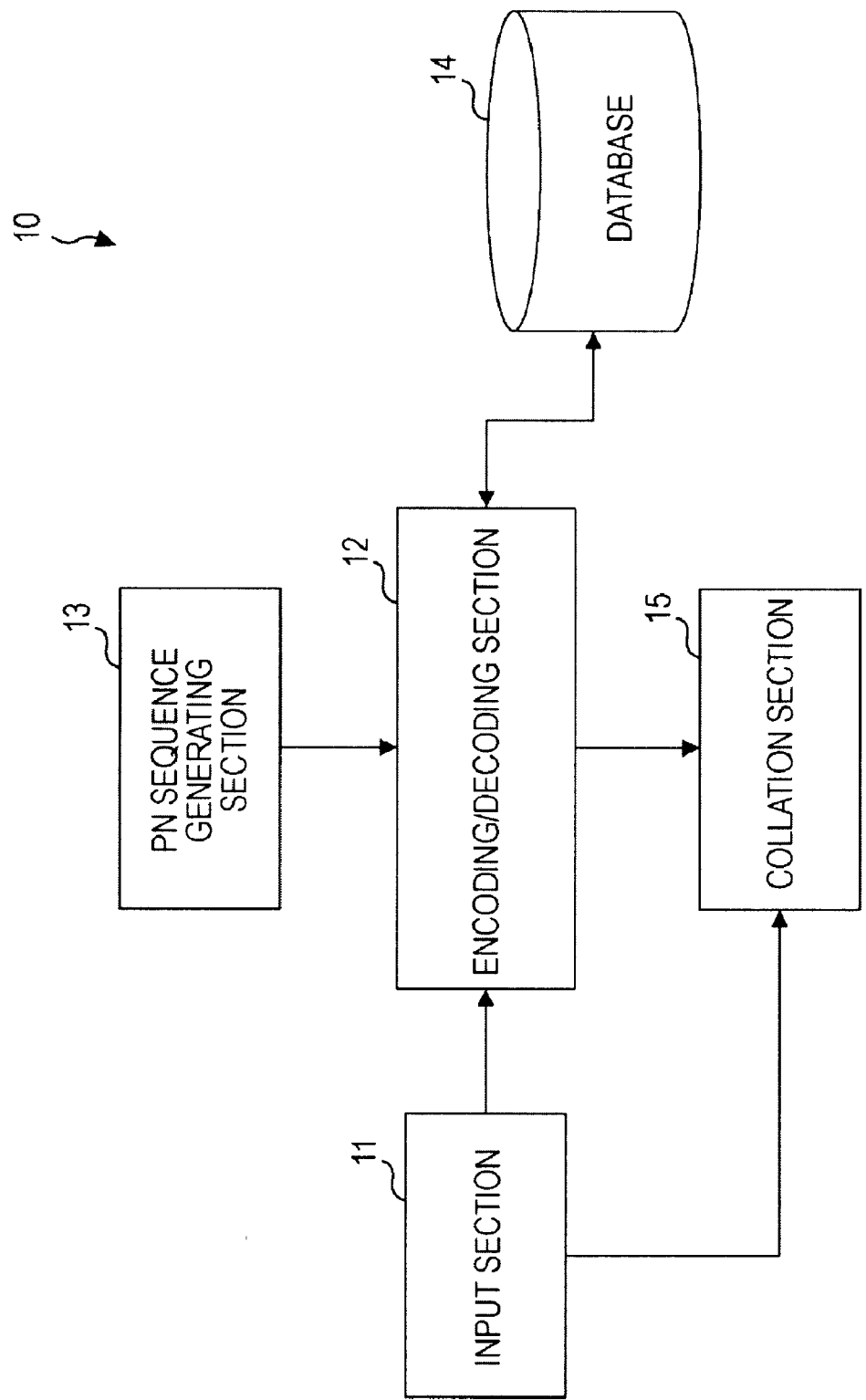
FIG. 1 is a block diagram showing an example of the configuration of an authentication system that encodes (encrypts (obfuscates)) data by using a PN sequence and registers the encoded data in a database.

Details of a data processing-apparatus, data processing method, and computer program according to embodiments of the present invention are described below with reference to the accompanying drawings.

The configuration of an authentication system 100 as an example of the data processing apparatus according to the embodiment of the present invention is described with reference to FIG. 4. Similarly to the authentication system 10 described with reference to FIG. 1, the authentication system 100 performs a biometrics authentication process using biometric information such as a user's fingerprint and vein pattern, and records confidential information in a database by using data obfuscation with pseudo random numbers (PN sequence).

User's fingerprint information or the like is input through an input section 101. An encoding/decoding section 106 receives the data input from the input section 101 and receives matrix data input from a matrix generating section 105, performs-encoding (encryption (obfuscation)) on the basis of both data, and registers the encoded data in a database 107. At a collation time, the encoding/decoding section 106 acquires the encoded data registered in the database 107, and receives the matrix data input from the matrix generating section 105. The encoding/decoding section 106 executes decoding on the basis of both data, and outputs the decoded result to a collation section 108. The collation section 108 executes processing of collation between the decoded result and new data input through the input section 101.

The authentication system 100 differs in configuration from the authentication system 10 in that, in encoding and decoding, a PN sequence generated by the PN sequence generating section 13 is not used but the matrix generated by the matrix generating section 105 is used.

Figure 4:
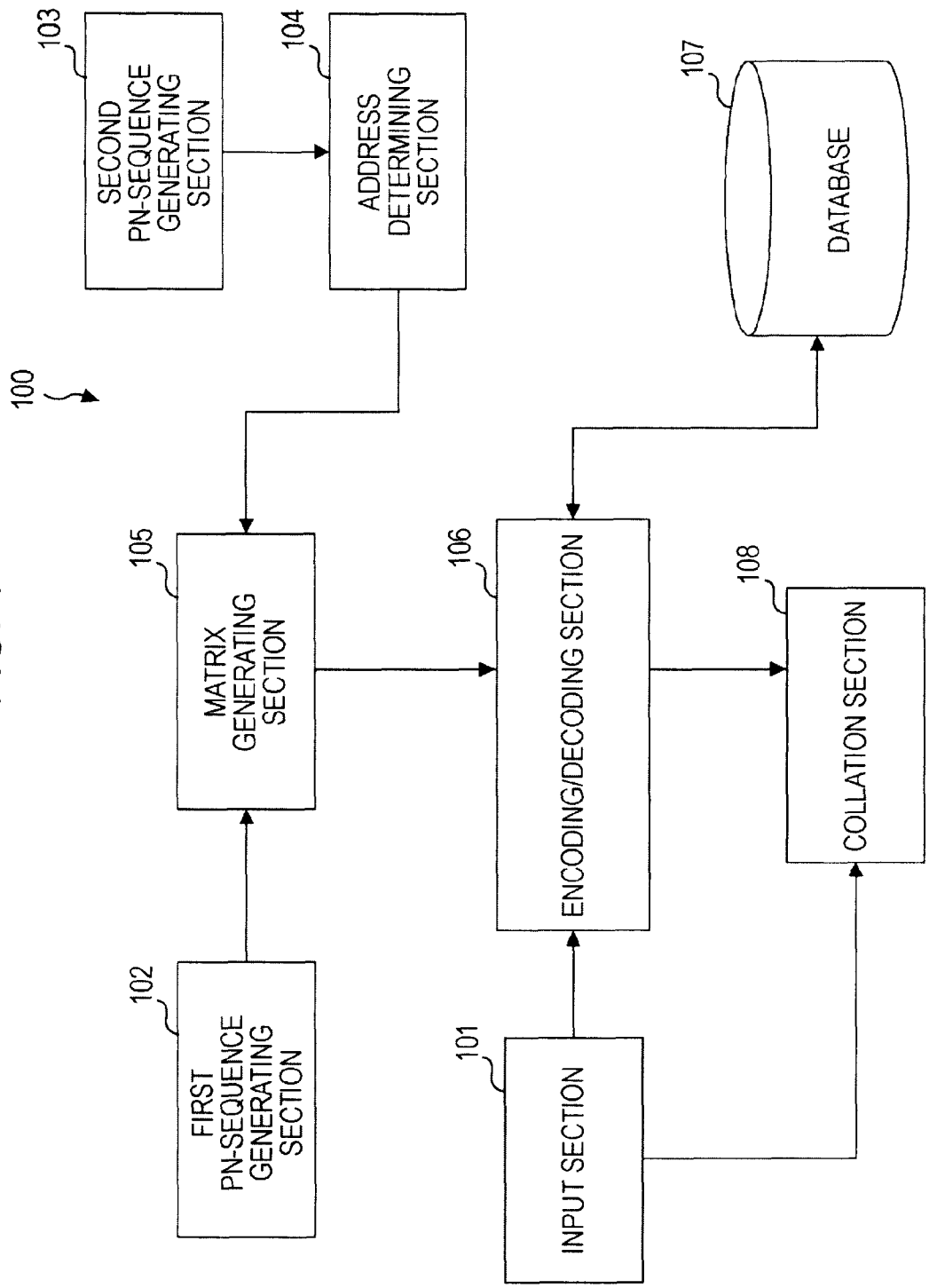
FIG. 4 is a block diagram showing the configuration of an authentication system as an example of a data processing apparatus according to an embodiment of the present invention.

The matrix generating section 105 receives PN sequence data input from the first PN-sequence generating section 102 (as first pseudo-random-number generating means) shown in FIG. 4. In addition, second PN sequence data generated by a second PN-sequence generating section 103 (as second pseudo-random-number generating means) is input to an address determining section 104. The address determining section 104 generates an address on the basis of the second PN sequence data generated by the second PN-sequence generating section 103.

The matrix generating section 105 receives the PN sequence data input from the first PN-sequence generating section 102 and the address generated by the address determining section 104 on the basis of the second PN sequence data generated by the second PN-sequence generating section 103, and generates the matrix data.

Figure 5:
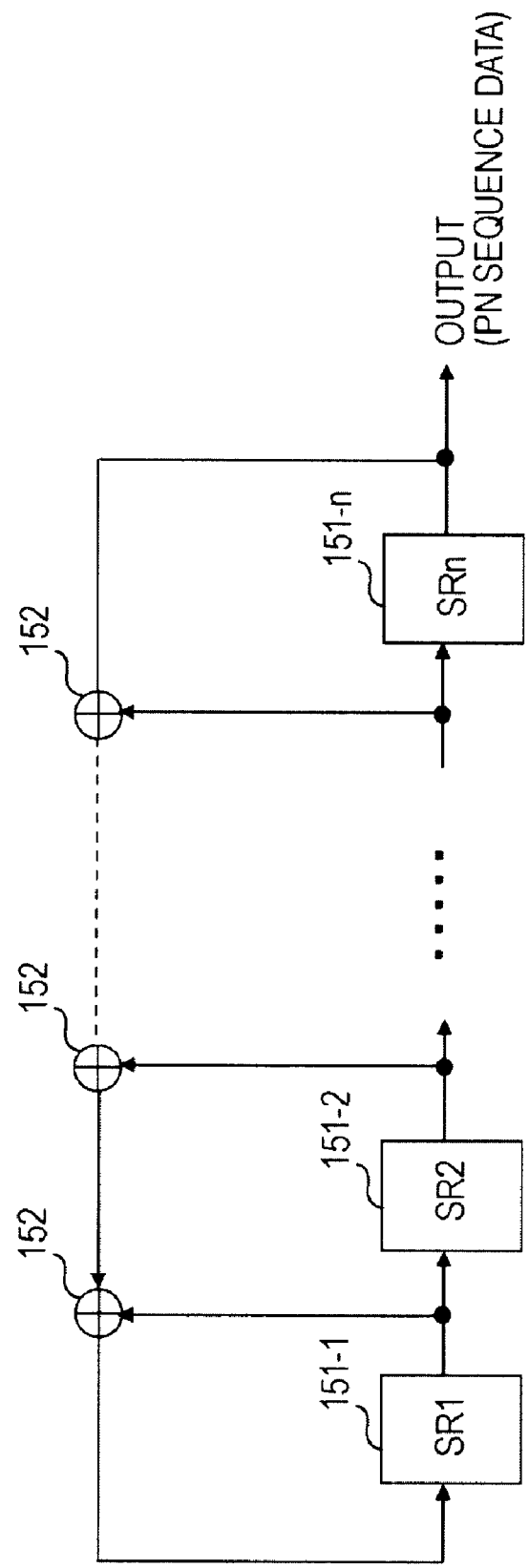
FIG. 5 is a block diagram showing an example of the configuration of a PN sequence generating section.

The matrix-generating section 105 generates matrix data including 0's and 1's. Each of the first PN-sequence generating section 102 and the second PN-sequence generating section 103 has a configuration similar to that described with reference to FIG. 2. For example, as shown in FIG. 5, each of the first PN-sequence generating section 102 and the second PN-sequence generating section 103 includes n-stage shift registers 151-1 to 151-*n* and exclusive OR operation units 152. The number n of shift registers does not need to be equal between the first PN-sequence generating section 102 and the second PN-sequence generating section 103. It is preferable that the number of stages of shift registers in the second PN-sequence generating section 103 be determined according to the number of pixels included in a matrix. The reason and a specific matrix generating process are described later.

Figure 6C:
FIGS. 6A, 6B, and 6C are illustrations showing an example of encoding of input data with matrix data by an encoding/decoding section.

Next, an example of an encoding process in the encoding/decoding section 106 for encoding input data by using matrix data is described with reference to FIGS. 6A to 6C. FIG. 6A shows input data, for example, image data obtained by binarizing information of the user's vein pattern. This image is template information that is used in a collation process at a collation time. This is encoded and stored in the database 107.

Figure 6B:
Figure 6A:
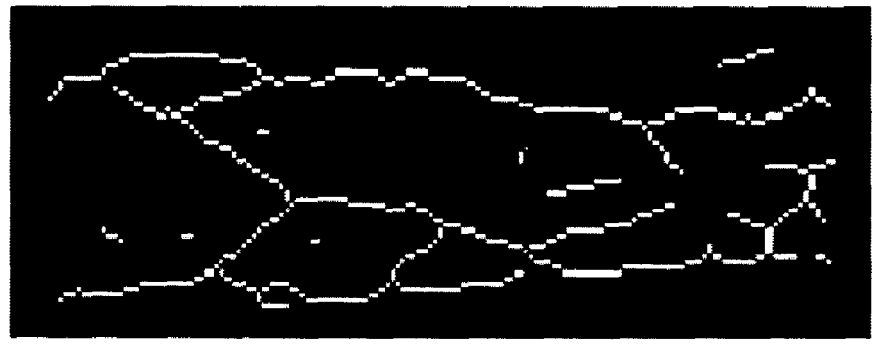

FIG. 6B shows an example of matrix data generated in a size identical to that of the input data in FIG. 6A. The matrix data is generated by the matrix generating section 105 shown in FIG. 4.

In both FIGS. 6A and 6B, the black color of each pixel represents "0", and the white color of each pixel represents FIG. 6C shows encoded result data obtained by performing exclusive OR operations between corresponding pixels in FIGS. 6A and 6B.

The encoding process is described with reference to FIGS. 7A to 7C. Similarly to FIGS. 6A to 6C, FIGS. 7A to 7C respectively show input data, matrix data, and encoded result data.

In each of FIGS. 7A to 7C, three corresponding pixels of each data are only shown.

In FIG. 7A, a pixel 211 of the input data is a black pixel, and its bit value="0".

In FIG. 7B, a corresponding pixel 221 of the matrix data is a black pixel, and its bit value="0".

In FIG. 7C, a pixel value of a corresponding pixel 231 of the encoded result data is the result of an exclusive OR operation between the bit value "0" (black) of the pixel 211 of the input data in FIG. 7A and the bit value "0" (black) of the corresponding pixel 221 of the matrix data in FIG. 7B. That is,

0(XOR)0=0

The corresponding pixel 231 of the encoded result data is set so that bit value "0"=black pixel.

This can apply to other corresponding pixels.

The pixel value of the pixel 232 of the encoded result data in FIG. 7C is the result of an exclusive OR operation between the bit value "1" (white) of the pixel 212 of the input data in FIG. 7A and the bit value "0" (black) of the corresponding pixel 222 of the matrix data in FIG. 7B. That is,

1(XOR)0=1

The pixel value of the pixel 232 of the encoded result data is set so that bit value "1"=white pixel.

The pixel value of the pixel 233 of the encoded result data in FIG. 7C is the result of an exclusive OR operation between the bit value "1" (white) of the pixel 213 of the input data in FIG. 7A and the bit value "1" (white) of the corresponding pixel 223 of the matrix data in FIG. 7B. That is,

1(XOR)1=0

The pixel value of the pixel 233 of the encoded result data is set so that bit value "0"=black pixel.

For example, as shown in FIGS. 7A and 7B, if each of the input data in FIG. 7A and the matrix data in FIG. 7B has a total of 9600 pixels (60 horizontal pixels by 160 vertical pixels), 9600 exclusive OR operations between corresponding pixels determine the pixel values of 9600 pixels of the encoded result data in FIG. 7C.

As described above, the encoding process in the data processing apparatus according to the embodiment is executed as processing in the encoding/decoding section 106 by using matrix data. Calculation is performed as follows:

"Pixel Value of Input Data" (XOR)"Matrix Data"="Encoded Result Data"

The calculated data is stored in the database 107 in the configuration shown in FIG. 4.

In addition, the decoding process is executed as processing in the encoding/decoding section 106 by using matrix data. Specifically, by performing an exclusive OR operation between the encoded result data in FIG. 7C and the matrix data in FIG. 7B, a decoded result is obtained. The decoded result is calculated as follows:

"Encoded Result Data" (XOR)"Matrix Data"="Decoded Result Data"

Since there is a feature in which implementation of an exclusive OR operation twice produces the original state, "Decoded Result Data" is identical to the input data in FIG. 7A.

In the embodiment of the present invention, as described above, instead of using a PN sequence, the encoding and decoding processes using matrix data are executed. Therefore, by concealing a matrix data generating techniques security of encoded data can be ensured.

Figure 2:
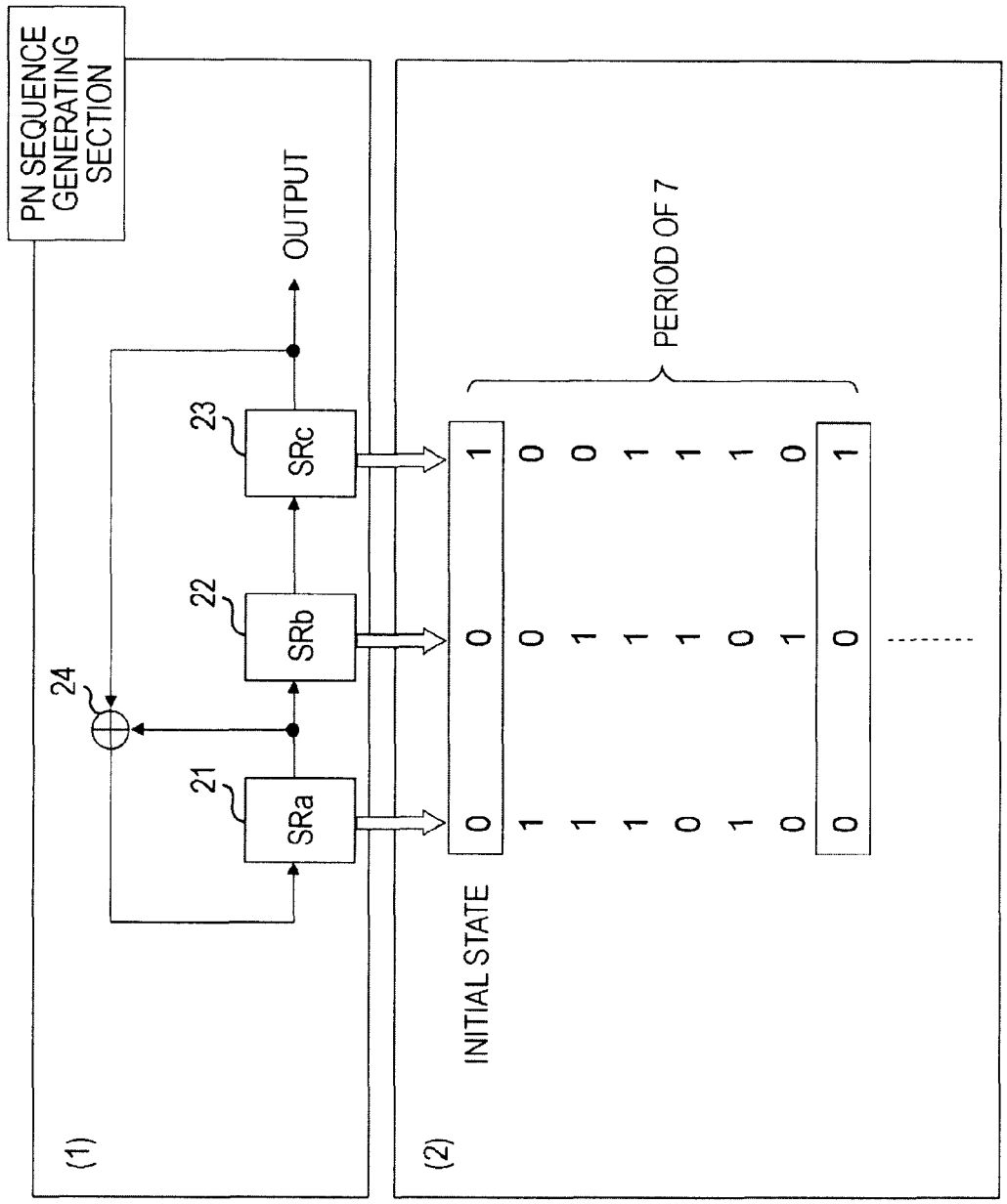
FIG. 2 is an illustration showing an example of the configuration and period of a PN sequence generating section.
Figure 3:
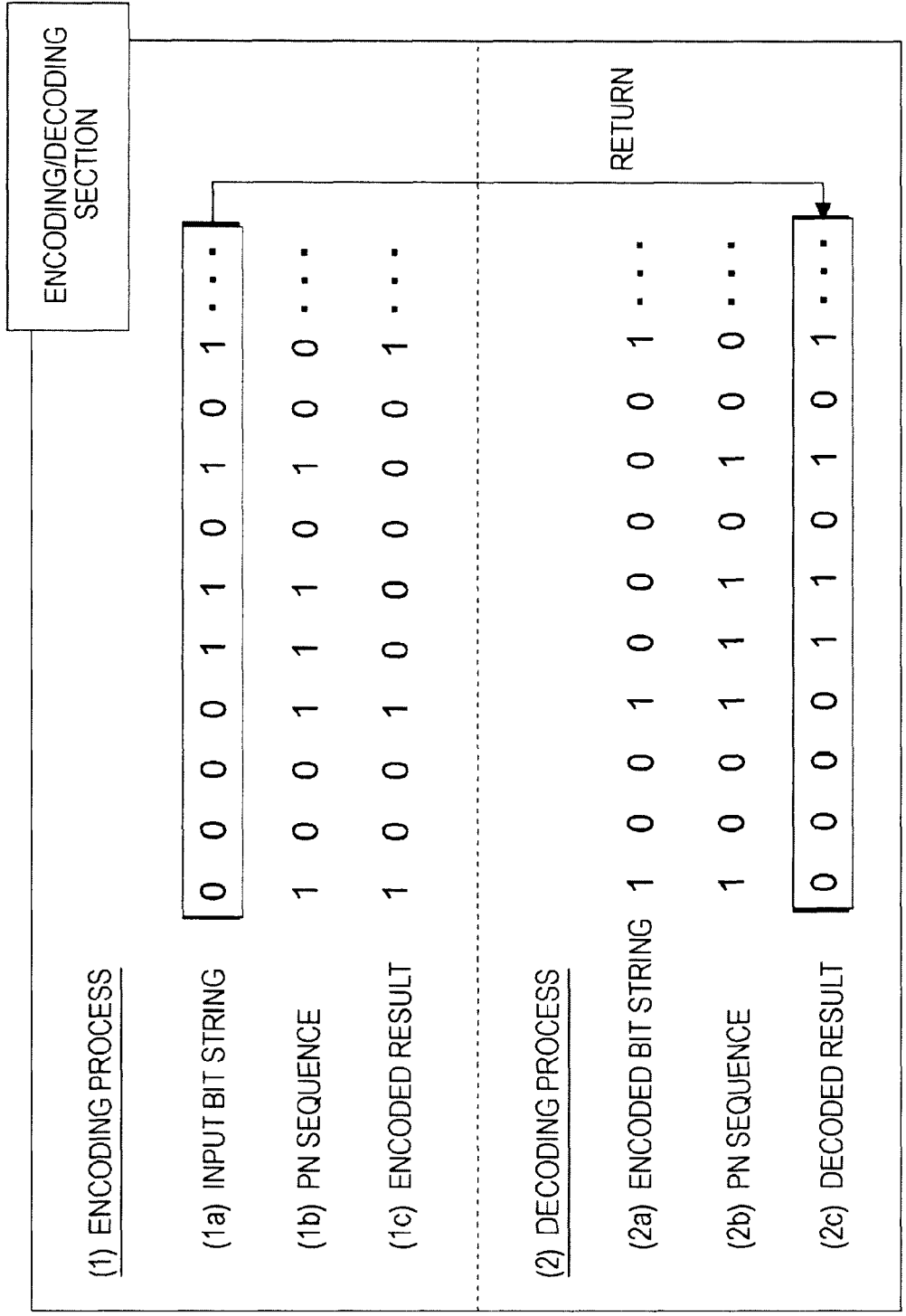
FIG. 3 is an illustration showing encoding and decoding processes on data by using a PN sequence.

When the encoded data generating process, described with reference to FIGS. 1 to 3, directly using a PN sequence, is described as a process of using the above matrix data, the encoded data generating process has the settings shown in FIG. 8.

Figure 8:
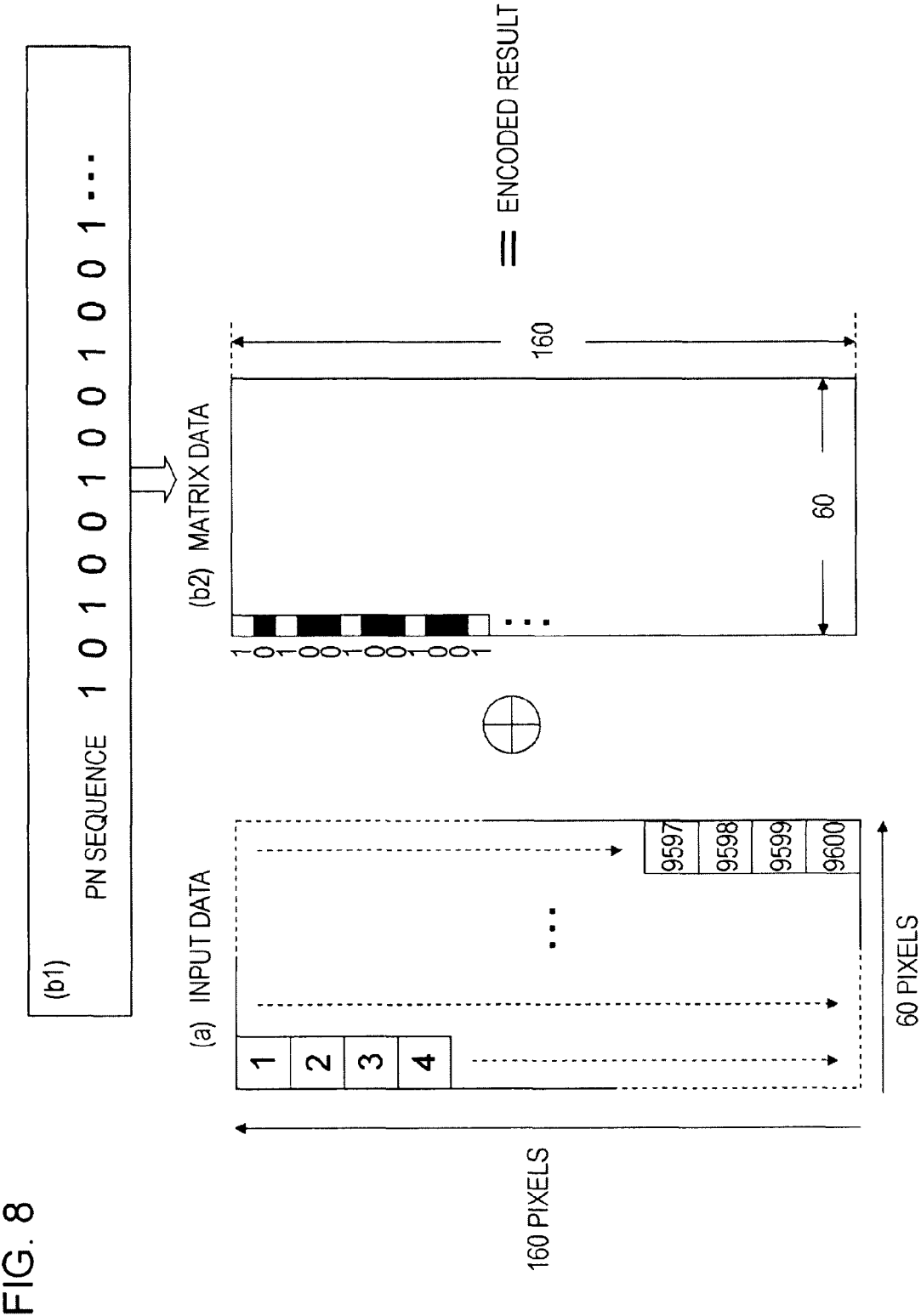
FIG. 8 is a diagram illustrating, as processing of using matrix data, an encoded data generating process to which a PN sequence is directly applied.

Part (a) of FIG. 8 shows input data. Part (b1) of FIG. 8 shows PN sequence data generated by the PN sequence generating section 13 in the configuration shown in FIG. 1. Part (b2) of FIG. 8 shows matrix data generated by vertically arranging the PN sequence data in an unchanged manner in the order of pixels. Part (b2) of FIG. 8 shows, as an example, an image size of 160 vertical pixels by 60 horizontal pixels. The matrix data in part (b2) of FIG. 8 is an example obtained by simply disposing a bit string generated on the basis of the PN sequence in the order of pixel addresses. The encoding/decoding section 12 in the configuration shown in FIG. 1 performs processing for obtaining an encoded result by executing exclusive OR operations between corresponding pixels of the input data in part (a) of FIG. 8 and the matrix data in part (b2) of FIG. 8.

However, in a configuration in which an encoded result is obtained such that a PN sequence generated by a PN sequence generating section is directly used for exclusive OR operations with the input data, as described above, by extracting a certain length of consecutive bit arrangement of the PN sequence data generated by the PN sequence generating section, the configuration of shift registers and feedback tap for generating the PN sequence can be presumed. If this analysis is successful, there is a possibility that an identical matrix may be reproduced. Reproduction of the identical matrix indicates that the decoding process for generating the input data from the encoded result data stored in a database is possible. In such a case, it may not be said that security of encoded image data is ensured.

In the data processing apparatus according to the embodiment of the present invention, a matrix generating process, in which an analysis process is made difficult, is executed. In other words, a highly confidential matrix generating technique is used. A matrix generating method according to an embodiment of the present invention is described below with reference to FIG. 9 and the subsequent drawings.

Figure 9:
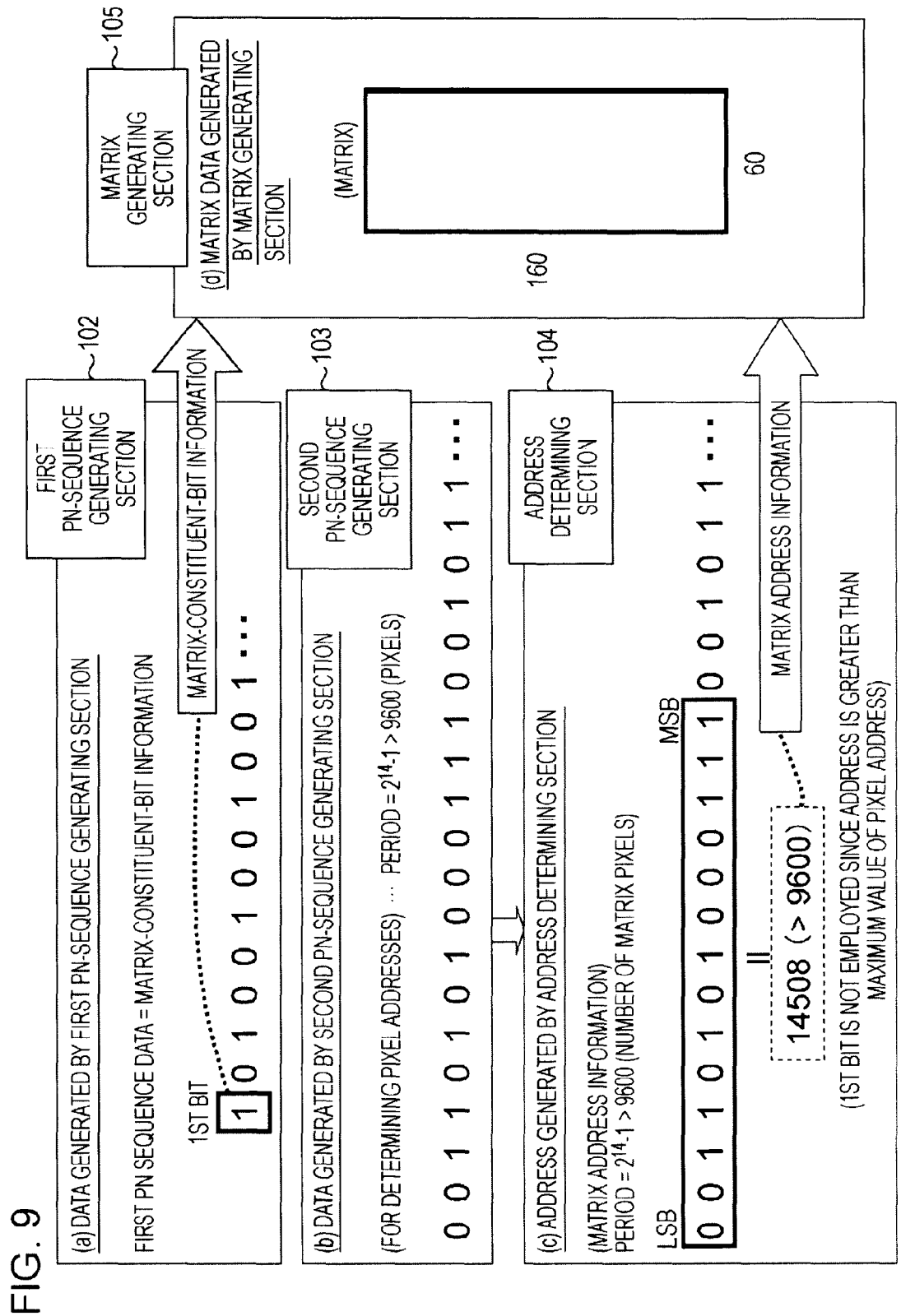
FIG. 9 is an illustration showing an example of a matrix generating process in the embodiment of the present invention.

FIG. 9 illustrates processes in the first PN-sequence generating section 102, the second PN-sequence generating section 103, the address determining section 104, and the matrix generating section 105 in the authentication system 100 shown in FIG. 4.

The matrix generating section 105 generates a matrix corresponding to image data in which 160 vertical pixels×60 horizontal pixels=9600 pixels.

The first PN-sequence generating section 102 generates, as a first PN sequence, a bit string including constituent bit information that is arranged in a matrix.

For example, if the first PN sequence generated by the first PN-sequence generating section 102 is "101001001001 . . . " as shown in FIG. 9, the first PN sequence "101001001001 . . . " is input bit by bit to the first PN-sequence generating section 102 from the head.

The first bit is "1", and this represents, for example, white.

The second bit is "0", and this represents, for example, black.

The third bit is "1", and this represents, for example, white.

They are set as candidate pixel values for one constituent pixel of the matrix generated by the matrix generating section 105.

However, one of them is actually set as a pixel value of a constituent pixel of the matrix only in a case in which an effective matrix address is input from the address determining section 104 to the matrix generating section 105. When an effective matrix address is input from the address determining section 104 to the matrix generating section 105, a pixel value (1=white, 0=black) according to bit information input from the first PN-sequence generating section 102 is set at the address position.

A matrix address determining process is executed by the address determining section 104. The address determining section 104 receives second PN sequence data generated by the second PN-sequence generating section 103.

The second PN sequence data generated by the second PN-sequence generating section 103 is "00110101000111001011 . . . ".

The address determining section 104 receives the second PN sequence data and selects predetermined consecutive bits. The address determining section 104 selects 14 bits from the head. A numerical value represented by the 14 bits is used as a first matrix address. In this example, the first matrix address is "00110101000111". This value is represented by "14508" in decimal number.

Figure 10:
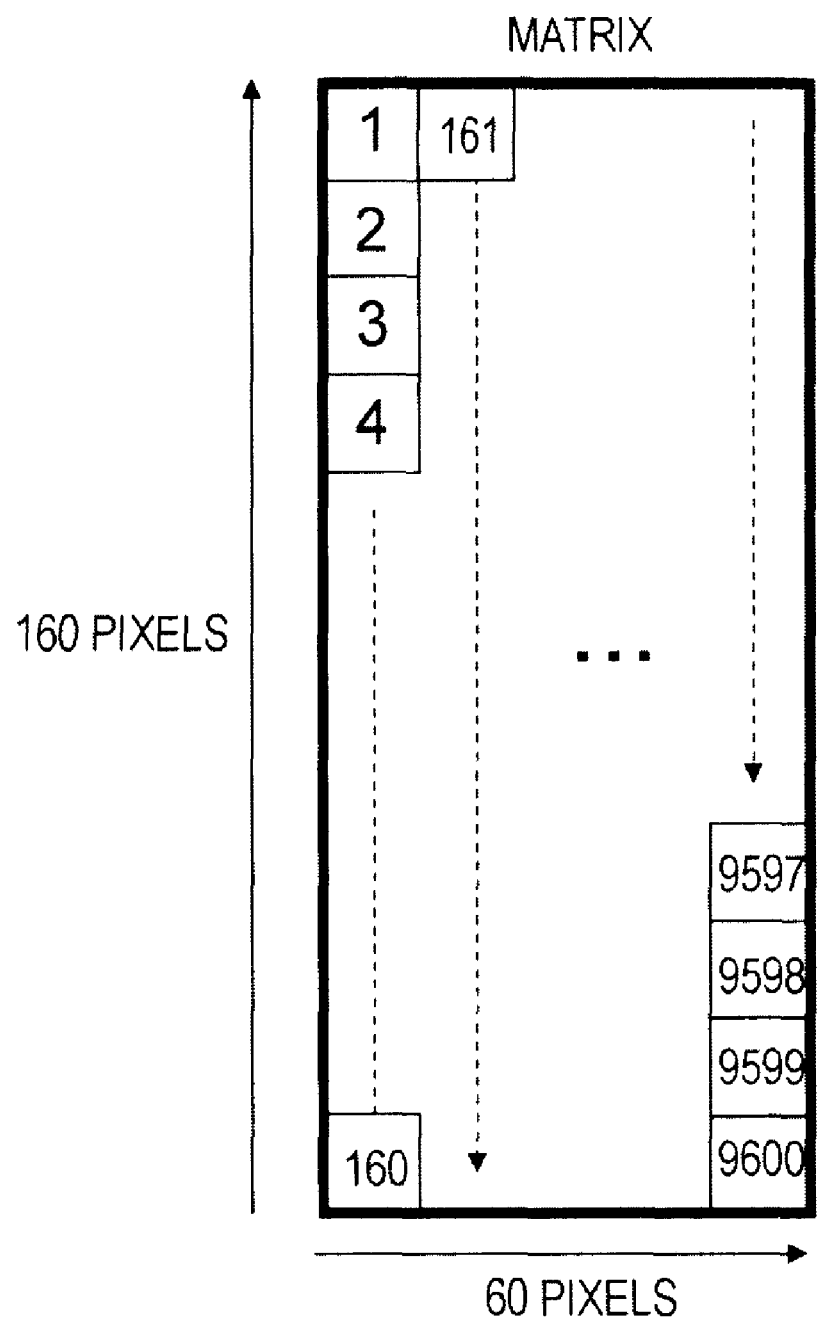
FIG. 10 is an illustration showing matrix addresses.

Matrix addresses are described with reference to FIG. 10. A matrix address represents a pixel position in the matrix generated by the matrix generating section 105. The example shown in FIG. 10 is a matrix corresponding to image data in which 160 vertical pixels×60 horizontal pixels=9600 pixels. Regarding the addresses, an address at a top left end is "1", and the address, is downwardly incremented by one. After a bottom left end, the address has "161" in the top of the next right column, and an address at a bottom right end has "9600".

In this example, the matrix has (160 vertical pixels×60 horizontal pixels=) 9600 pixels.

Addresses 1 to 9600 are used as effective addresses.

Therefore, the first matrix address, "00110101000111" (="14508"), described with reference to FIG. 9, generated by the address determining section 104, exceeds 9600. Thus, the first matrix address is invalid.

In this case, in the first PN sequence "101001001001 . . . " generated by the first PN-sequence generating section 102, the first bit "1" (=white) is not used as constituent pixel information of the matrix generated by the matrix generating section 105.

The address determining section 104 has been described as receiving the second PN sequence data and selecting predetermined consecutive bits. In this embodiment, 14 consecutive bits are selected. This selection is determined on the basis of the number of matrix constituent pixels (=9600). This is for selecting the number of bit data from which address data 1 to 9600 can be obtained since $2^{14} \geqq 9600 \geqq 2^{13}$.

The address determining section 104 sequentially determines addresses from the second PN sequence data on the basis of the settings:
- first address: 1st to 14th bits;
- second address: 2nd to 15th bits;
- third address: 3rd to 16th bits; and
- fourth address: 4th to 17th bits.

These are sequentially described with reference to FIG. 11. When each 14-bit data has 1 to 9600, the matrix generating section 105 determines a pixel position as an effective address.

To determine all the matrix constituent pixels 1 to 9600, addresses 1 to 9600 need to be generated. To guarantee the generation of addresses 1 to 9600, it is necessary for the period of the second PN sequence data generated by the second PN-sequence generating section 103 to be not less than a predetermined level. In this case, it is necessary for the period of the second PN sequence data generated by the second PN-sequence generating section 103 to be not less than 9600 or greater. In the embodiment, the period of the second PN sequence data generated by the second PN-sequence generating section 103 is set to $2^{14}-1$. As described above, since a PN sequence has a feature in that data in shift registers can take all states excluding a pattern of all zeroes, the period is represented by (two to the power of the number of stages of shift registers)−1. In the case in FIG. 2, since the number of stages of shift registers is 3, the period is represented by $2^3-1=7$.

Therefore, when the period of the second PN sequence data is $2^{14}-1$, the number of stages of shift registers may be 14.

A process for the second bit "0" (=black) of the first PN sequence "101001001001 . . . " generated by the first PN-sequence generating section 102 is described below.

Figure 11:
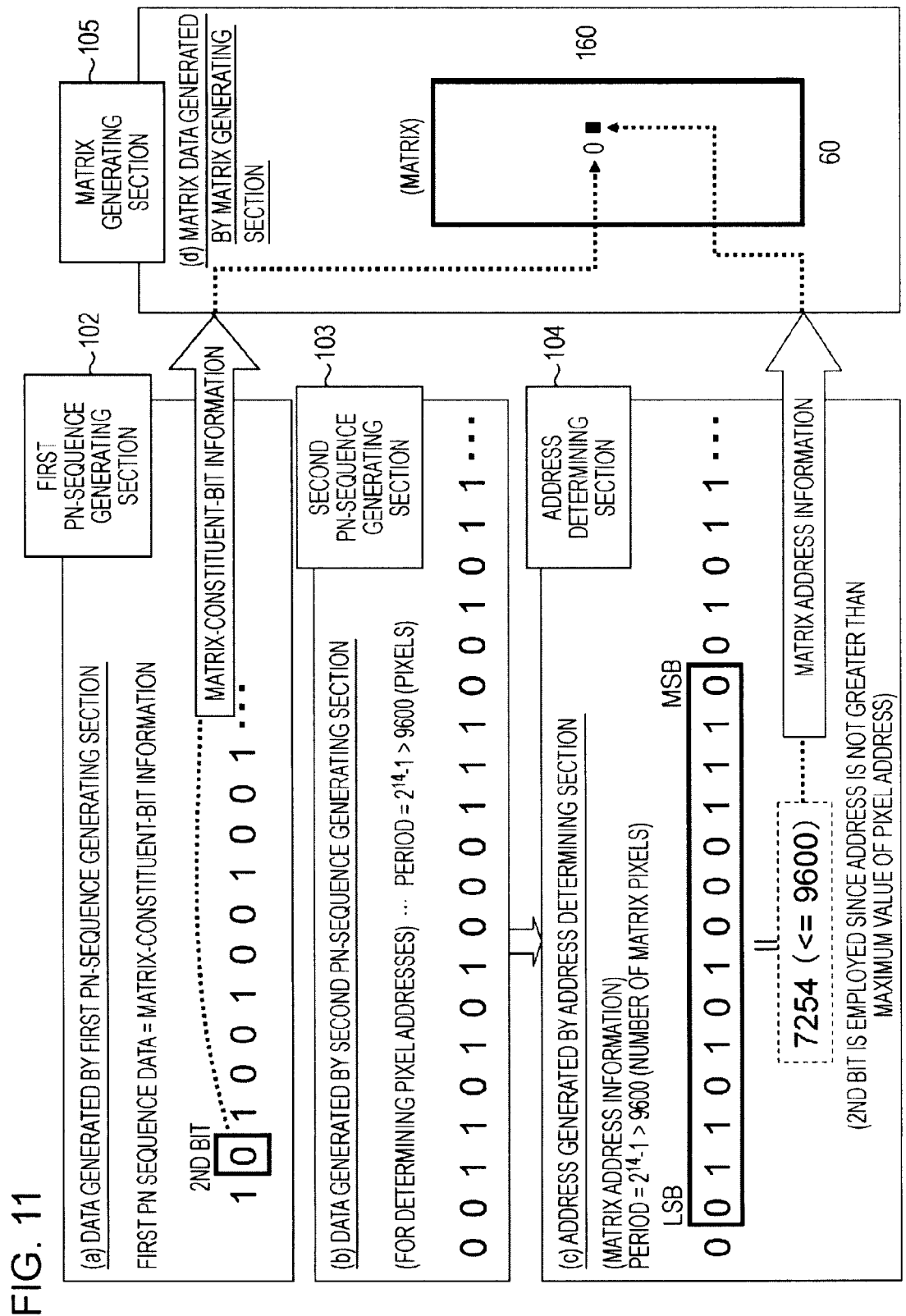
FIG. 11 is an illustration showing an example of a matrix generating process in the embodiment of the present invention.

In FIG. 11, the second bit "0" (=black) of the first PN sequence generated by the first PN-sequence generating section 102 is set as a candidate pixel value for a constituent pixel of the matrix generated by the matrix generating section 105.

The address determining section 104 receives the second PN sequence data, "00110101000111001011 . . . ", generated by the second PN-sequence generating section 103, and selects 14 bits from the 2nd bit to the 15th bit. A numerical value represented by the 14 bits is used as a matrix address that is a position at which the second bit "0" (=black) of the first PN sequence is placed in the matrix. In this example, the matrix address is "01101010001110". This is represented by "7254" in decimal number.

Since "7254" is not greater than the maximum address "9600" in the matrix, the matrix address is used as an effective address. In this case, the second bit "0" (=black) of the first PN sequence "101001001001 . . . " is used as constituent pixel information of the matrix generated by the matrix generating section 105. At an ad dress position represented by the address "01101010001110" (="7254") determined by the address determining section 104, "0" (=black) is set.

Next, a process for the third bit "1" (=white) of the first PN sequence "01001001001 . . . " generated by the first PN-sequence generating section 102 is described below with reference to FIG. 12.

Figure 12:
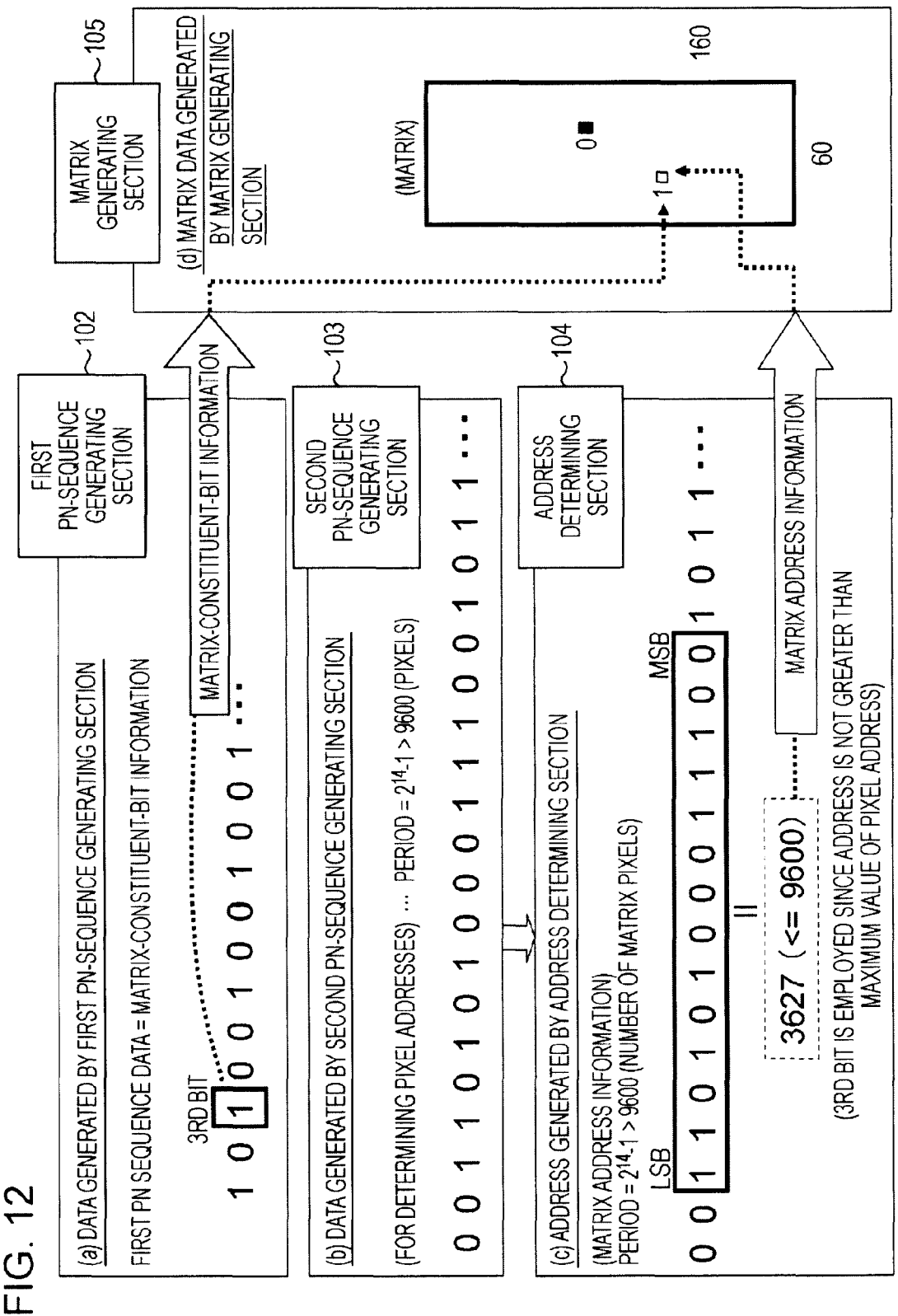
FIG. 12 is an illustration showing an example of a matrix generating process in the embodiment of the present invention.

In FIG. 12, the third bit "1" (=white) of the first PN sequence generated by the first PN-sequence generating section 102 is set as a candidate pixel value for a constituent pixel of the matrix generated by the matrix generating section 105.

The address determining section 104 receives the second PN sequence data "00110101000111011 . . . " generated by the second PN-sequence generating section 103, and selects 14 bits from the 3rd bit to the 16th bit. A numerical value represented by the 14 bits is used as a matrix address that is a position at which the third bit "1" (=white) of the first PN sequence is placed in the matrix. In this example, the matrix address is "11010100011100". This is represented by "3627" in decimal number.

Since "13627" is not greater than the maximum address "9600" of the matrix, the matrix address is used as an effective address. In this case, the third bit "1" (=white) of the first PN sequence "1010010001001 . . . " generated by the first PN-sequence generating section 102 is used as constituent pixel information of the matrix generated by the matrix generating section 105. At an address position represented by the address "11010100011100" (=13627") determined by the address determining section 104, "1" (=white) is set.

Next, a process for the fourth bit "0" (=black) of the first PN sequence "101001001001 . . . " generated by the first PN-sequence generating section 102 is described below with reference to FIG. 13.

Figure 13:
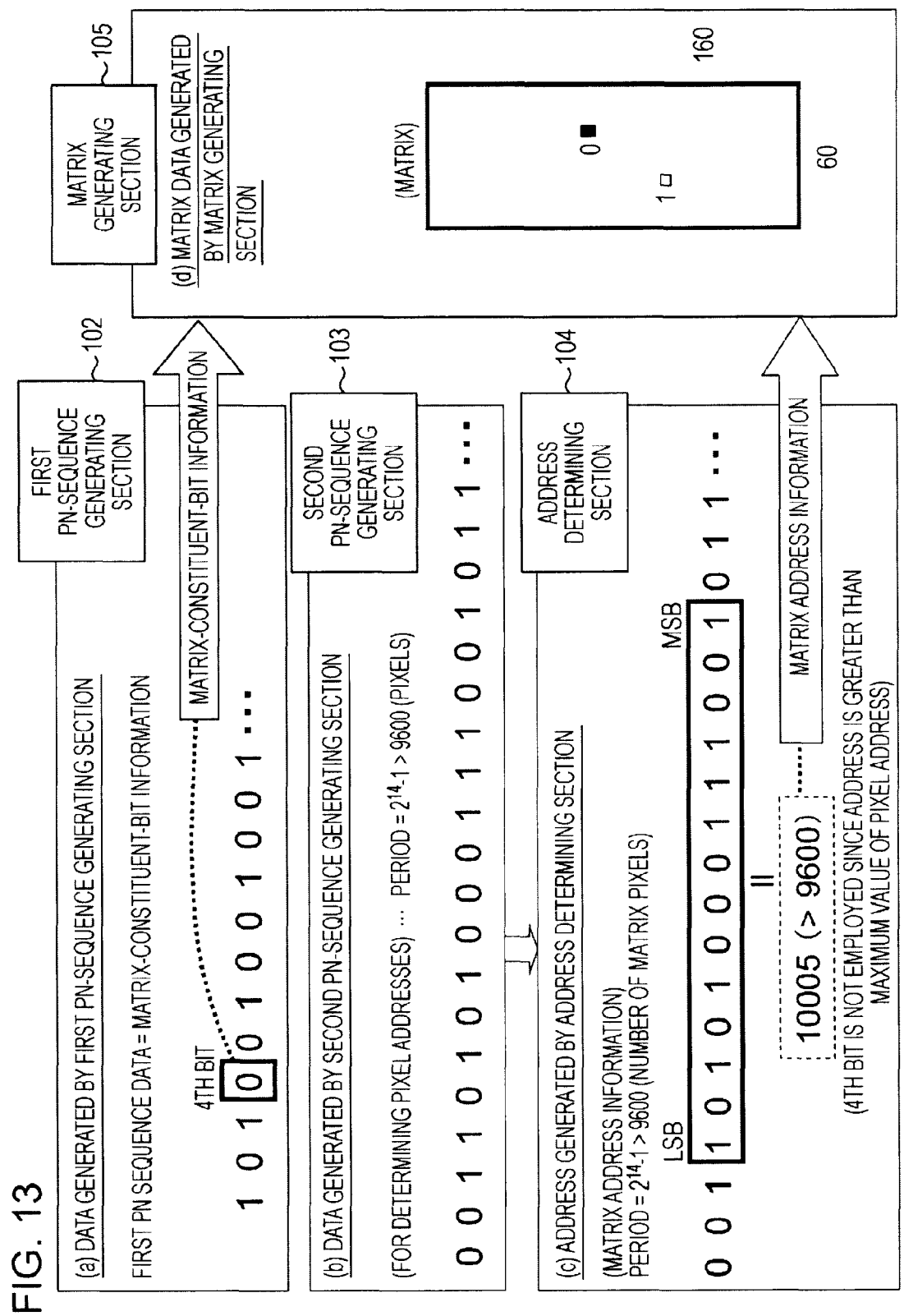
FIG. 13 is an illustration showing an example of a matrix generating process in the embodiment of the present invention.

In FIG. 13, the fourth bit "0" (=black) of the first PN sequence generated by the first PN-sequence generating section 102 is set as a candidate pixel value for a constituent pixel of the matrix generated by the matrix generating section 105.

The address determining section 104 receives the second PN sequence data "00110101000111001011 . . . " generated by the second PN-sequence generating section 103, and selects 14 bits from the 4th bit to the 17th-bit. A numerical value represented by the 14 bits is used as a matrix address that is a position at which the fourth bit "0" (=black) of the first PN sequence is placed in the matrix. In this example, the matrix address is "10101000111001". This is represented by "10005" in decimal number.

Since "10005" is greater than the maximum address "9600" in the matrix, the matrix address is not used as an effective address and is invalid. In this case, the fourth bit "0" (=black) of the first PN sequence "101001001001 . . . " generated by the first PN-sequence generating section 102 is not used as constituent pixel information of the matrix generated by the matrix generating section 105.

By sequentially executing the processing, pixel values of all the image data in (160 vertical pixels×60 horizontal pixels=) 9600 pixels generated by the matrix generating section 105 are set. As described above, a PN sequence has a feature in that data in shift registers can take all states excluding a pattern of all zeroes. Thus, when the period of the second PN sequence data is set to $2^{14}-1$, bit data is selected by using settings of the 1st bit to the 14th bit, the 2nd bit to the 15th bit, the 3rd bit to the 16th bit, . . . , ($2^{14}-1=$) 16383 patterns appear. In this manner, the second PN sequence data generated by the second PN-sequence generating section 103 takes all values from 1 to 16383 in one period. Thus, at the time the processing for one period has finished, it is ensured that bits for all the addresses in the matrix are established.

The matrix data generated as described above serves as the matrix data described with reference to FIG. 6B. By using, as matrix constituent pixel values, constituent bits of the first PN sequence generated by the first PN-sequence generating section 102, and using, as matrix addresses, constituent bits of the second PN sequence generated by the second PN-sequence generating section 103, the matrix generating section 105 shown in FIG. 4 generates matrix data in which matrix pixels are formed by 0's and 1's.

The encoding/decoding section 106 shown in FIG. 4 executes the encoding and decoding processes by using the matrix data generated as described above. In other words, as described with reference to FIGS. 6A to 6C and 7A to 7C, the encoding process is executed as processing using the matrix data in the encoding/decoding section 106. Encoded result data is calculated as follows:

"Pixel Value of Input Data" (XOR) "Matrix Data"="Encoded Result Data".

The calculated data is stored in the database 107 in the configuration shown in FIG. 4.

In addition, the decoding process is also executed as processing using the matrix data in the encoding/decoding section 106. In other words, by performing exclusive OR operations between the encoded result data in FIG. 7C and the matrix data in FIG. 7B, a decoded result is obtained. The decoded result is calculated as follows:

"Encoded Result Data" (XOR) "Matrix Data"="Decoded Result Data".

Since there is a feature in which implementation of an exclusive OR operation twice produces the original state, "Decoded Result Data" is identical to the input data in FIG. 7A.

Figure 14:
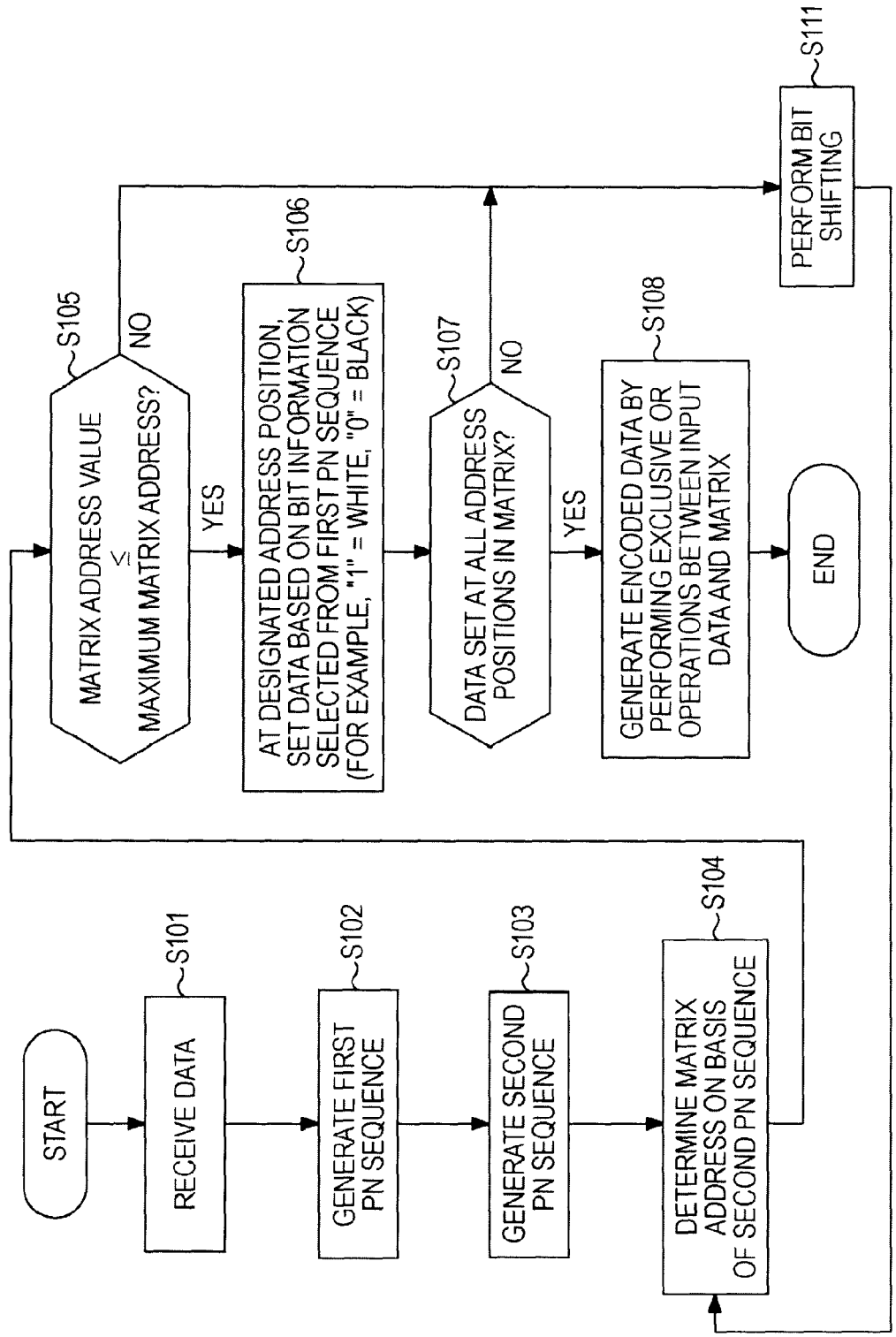
FIG. 14 is a flowchart illustrating a sequence of an input data encoding process executed by the data processing apparatus according to the embodiment of the present invention.

Next, a sequence of an input data encoding process executed by the data processing apparatus according to the embodiment of the present invention is described below with reference to the flowchart shown in FIG. 14. In step S101, data to be encoded, for example, in the above-described case, image data including vein information, is received. The image data is received through the input section 101 in the configuration shown in FIG. 4.

In step S102, the first PN-sequence generating section 102 in the configuration shown in FIG. 4 generates first PN sequence data. As described above, the first PN sequence data is used as pixel value designating information of a constituent pixel of the matrix data generated by the matrix generating section 105. For example, 0=black and 1=white. In the embodiment, a case having settings of 0=black and 1=white has been described. However, the settings may be reversed. In addition, data other than white and black may be associated with each bit.

In step S103, the second PN-sequence generating section 103 in the configuration shown in FIG. 4 generates second PN sequence data. As described above, the second PN sequence data is used as an address (matrix address) of the matrix data generated by the matrix generating section 105.

Step S104 is a processing step of the address determining section 104 in the configuration shown in FIG. 4. In step S104, by sequentially selecting predetermined consecutive bits from the second PN sequence data generated by the second. PN-sequence generating section 103, a matrix address value is determined. In step S105, the address determining section 104 determines whether or not the matrix address value including bit information selected from the second PN sequence data is not greater than the maximum address of the matrix generated by the matrix generating section 105. In the above embodiment, the matrix generated by the matrix generating section 105 has (60×160=) 9600 pixels, and matrix addresses 1 to 9600 are used as effective addresses. Accordingly, it is determined whether or not the matrix address value including bit information selected from the second PN sequence data is not greater than 9600.

If the matrix address value including bit information selected from the second PN sequence data is not greater than the maximum matrix address, the process proceeds to step S106. If the matrix address value including bit information selected from the second PN sequence data is greater than the maximum matrix address, the process proceeds to step S111. In step S111, bit shifting is executed. The bit shifting includes the following two processing steps:

(a) Step of shifting, by one bit, pixel-value selection bits from the first PN sequence data generated by the first PN-sequence generating section 102; and (b) Step of shifting, by one bit, address selection bits from the second PN sequence data generated by the second PN-sequence generating section 103.

These steps of bit shifting are executed. After that, step 3104 and the subsequent steps are repeatedly executed.

If the matrix address value including bit information selected from the second PN sequence data is not greater than the maximum matrix address, the process proceeds to step S106. In step S106, at a designated matrix address position determined on the basis of the second PN sequence, data (e.g., "1"=white, "0" black) based on bit information selected from the first PN sequence is set. This processing is executed by the matrix generating section 105 shown in FIG. 4.

In step S107, the matrix generating section 105 determines whether or not data (pixel values) have been set at all address positions in the matrix. If there is an address at which no data has been set, the process proceeds to step S111. After the bit shifting is executed in step S111, step S104 and the subsequent steps are repeatedly executed.

If, in step S107, it is determined that data (pixel values) have been set at all the address positions (e.g., 1 to 9600) in the matrix, the process proceeds to step S108. In step S108, the encoding/decoding section 106 generates encoded data by executing exclusive OR operations between corresponding pixels in the data input in step S101 and the generated matrix data. This processing generates the encoded data described with reference to FIG. 6C.

The encoded data generated in this manner is stored in a storage unit. In collation, the encoding/decoding section 106 reproduces the input data by executing exclusive OR operations between the encoded data and the matrix data, and the collation section 108 executes collation of the reproduced input data with new input data. In the case of performing the decoding process on the encoded data, for the first PN sequence and the second PN sequence, by setting initial values of the shift registers to be identical to those in the encoding process so that a matrix identical to that in the encoding process is generated, the original image data can be restored.

As a matrix used in the decoding process, a matrix identical to that used in the encoding process is used. As this matrix, the matrix generated in the encoding process may be stored in the storage unit. Alternatively, in the decoding process, by executing a matrix generating process in accordance with a sequence similar to that in the case of generating the matrix, an identical matrix may be generated.

In the encoding and decoding processes (using a matrix) in accordance with the embodiment of the present invention, a bit string generated by a certain PN-sequence generating section is placed at random in the matrix in accordance with addresses generated by another PN-sequence generating section, so that it is very difficult to presume a PN-sequence generating technique from a bit arrangement in the matrix. Therefore, a risk in which image data is restored by using a matrix identical to that in encoding can be considerably suppressed. In addition, instead of using all bits of the first PN sequence as pixel values, in accordance with address values of the second PN sequence, a case in which bits are placed as pixel values in the matrix and a case in which bits are not placed as pixel values in the matrix occur. Thus, even if a string of bit data sequentially used in matrix generation is analyzed, the analyzed string of data differs from the original PN sequence data, so that it is difficult to analyze the original PN sequence and it is difficult to presume a matrix generating technique.

Further, by changing initial values in shift registers concerning a first PN sequence for generating a bit string of a matrix and a second PN sequence for generating addresses, a generated bit string and addresses can be changed in a random order. By changing the initial values every time or if necessary, confidentiality of the matrix generating technique can be further enhanced.

The present invention has been fully described while referring to a specific embodiment. However, it is obvious that persons skilled in the art can modify and substitute the embodiment without departing the gist of the present invention. In other words, the present invention has been disclosed in a form of exemplification and should not be interpreted in limited sense. To determine the gist of the present invention, the appended claims should be considered.

In addition, the consecutive processing described in the specification can be executed by hardware, software, or a combination of both. In the case of executing processing by software, the processing can be executed by installing a program containing a processing sequence into a memory in a computer built into dedicated software, or installing the program into a multipurpose computer capable of executing various types of processing.

For example, the program can be recoded beforehand a hard disk or ROM (read-only memory) as a recording medium. Alternatively, the program can be temporarily or permanently stored (recorded) in a removable recording medium such as a CD-ROM (compact-disc read-only memory), an MO (magneto-optical) disc, a DVD (digital versatile disc), a magnetic disk, or a semiconductor memory. Such a removable recording medium can be provided as so-called package software.

In addition to installation of the program from the removable recording medium to a computer, by wirelessly transferring the program from a download site to the computer, or transferring the program in a wired manner to the computer through a network such as a LAN (local area network) or the Internet, the computer can receive and install the transferred program into a recording medium such as a built-in hard disk.

Various types of processing described in this specification are nor only executed in a time-series manner in accordance with the description, but also executed in parallel or separately according to a processing capability of an apparatus for executing the processing or if necessary. In addition, the system in this specification is a logical set of a plurality of apparatuses and is not limited to a case in which apparatuses having configurations are accommodated in the same housing.

What is claimed is:

1. A data processing apparatus comprising:
   input means for receiving input data to be encoded;
   first pseudo-random-number generating means for generating a first pseudo-random number;
   second pseudo-random-number generating means for generating a second pseudo-random number;
   address determining means for determining matrix address candidate values on the basis of a bit string of the second pseudo-random number;
   matrix generating means for generating a matrix in which pixel values based on constituent bit values of the first pseudo-random number are set at matrix positions designated on the basis of the matrix address candidate values; and
   encoding means for generating encoded data by executing exclusive OR operations between corresponding positional data in the matrix generated by the matrix generating means and the received input data.

2. The data processing apparatus according to claim 1, wherein the address determining means executes processing in which, as a result of comparing each matrix address candidate value and a maximum address of the matrix generated by the matrix generating means, when the matrix address candidate value is not greater than the maximum address of the matrix, the matrix address candidate value is used as an address for use in matrix generation, and, when the matrix address candidate value is greater than the maximum address of the matrix, the matrix address candidate value is not used as the address for use in matrix generation.

3. The data processing apparatus according to claim 1,
   wherein, when each matrix address candidate value is not greater than a maximum address of the matrix, the matrix generating means sets, at a designated position of the matrix address candidate value, one pixel value based on one constituent bit value of the first pseudo-random number, and
   wherein, when the matrix address candidate value is greater than the maximum address of the matrix, the matrix generating means does not use, for matrix generation, the pixel value based on the constituent bit value of the first pseudo-random number.

4. The data processing apparatus according to claim 1,
   wherein the address determining means executes processing for sequentially determining the matrix address candidate values by sequentially shifting a bit string selected from the bit string of the second pseudo-random number generated by the second pseudo-random-number generating means, and
   wherein the matrix generating means executes processing in which the constituent bit values of the first pseudo-random number are selected so as to correspond to the matrix address candidate values determined by the address determining means, while sequentially shifting the constituent bit values of the first pseudo-random number, and, when each matrix address candidate value is not greater than a maximum address of the matrix, a pixel value based on a bit value selected from the first pseudo-random number is set at a designated position of the matrix address candidate value.

5. The data processing apparatus according to claim 1, wherein the second pseudo-random-number generating means generates a pseudo-random number having a period that is not less than the number of matrix addresses necessary for forming the matrix generated by the matrix generating means.

6. The data processing apparatus according to claim 1, wherein the first pseudo-random-number generating means and the second pseudo-random-number generating means are pseudo-random-noise-sequence generating means.

7. The data processing apparatus according to claim 1, further comprising:
   decoding means for generating decoded data by executing exclusive OR operations between corresponding positional data in the matrix generated by the matrix generating means and the encoded data generated by the encoding means; and
   collation means for executing collation between the decoded data generated by the decoding means and received data from the input means.

8. A data processing method for a data processing apparatus, comprising the steps of:
   receiving input data to be encoded;
   generating a first pseudo-random number;
   generating a second pseudo-random number;

determining matrix address candidate values on the basis of a bit string of the generated second pseudo-random number;

generating a matrix in which pixel values based on constituent bit values of the generated first pseudo-random number are set at matrix positions designated on the basis of the matrix address candidate values; and generating encoded data by executing exclusive OR operations between corresponding positional data in the generated matrix and the received input data.

9. The data processing method according to claim 8, wherein the step of determining the matrix address candidate values includes executing processing in which, as a result of comparing each matrix address candidate value and a maximum address of the matrix, when the matrix address candidate value is not greater than the maximum address of the matrix, the matrix address candidate value is used as an address for use in matrix generation, and when the matrix address candidate value is greater than the maximum address of the matrix, the matrix address candidate value is not used as the address for use in matrix generation.

10. The data processing method according to claim 8, wherein, in the step of generating the matrix, when each matrix address candidate value is not greater than a maximum address of the matrix, one pixel value based on one constituent bit value of the first pseudo-random number is set at a designated position of the matrix address candidate value, and when the matrix address candidate value is greater than the maximum address of the matrix, the pixel value based on the constituent bit value of the first pseudo-random number is not used for matrix generation.

11. The data processing method according to claim 8, wherein the step of determining the matrix address candidate values includes executing processing for sequentially determining the matrix address candidate values by sequentially shifting a bit string selected from the bit string of the generated second pseudo-random number, and wherein the step of generating the matrix executes processing in which the constituent bit values of the first pseudo-random number are selected so as to correspond to the matrix address candidate values determined in the step of determining the matrix address candidate values, while sequentially shifting the constituent bit values of the first pseudo-random number, and, when each matrix address candidate value is not greater than a maximum address of the matrix, a pixel value based on a bit value selected from the first pseudo-random number is set at a designated position of the matrix address candidate value.

12. The data processing method according to claim 8, wherein, in the step of generating the second pseudo-random number, a pseudo-random number having a period that is not less than the number of matrix addresses necessary for forming the generated matrix is generated.

13. The data processing method according to claim 8, wherein, in each of the step of generating the first pseudo-random number and the step of generating the second pseudo-random number, a pseudo-random noise sequence is generated.

14. The data processing method according to claim 8, further comprising the steps of:

generating decoded data by executing exclusive OR operations between corresponding positional data in the generated matrix and the generated encoded data; and executing collation between the generated decoded data and received data.

15. A computer program for causing a data processing apparatus to execute data processing comprising the steps of:

receiving input data to be encoded;

generating a first pseudo-random number;

generating a second pseudo-random number;

determining matrix address candidate values on the basis of a bit string of the second pseudo-random number;

generating a matrix in which pixel values based on constituent bit values of the generated first pseudo-random number are set at matrix positions designated on the basis of the matrix address candidate values; and generating encoded data by executing exclusive OR operations between corresponding positional data in the generated matrix and the received input data.

16. A data processing apparatus comprising:

an input section configured to receive input data to be encoded;

a first pseudo-random-number generating section configured to generate a first pseudo-random number;

a second pseudo-random-number generating section configured to generate a second pseudo-random number;

an address determining section configured to determine matrix address candidate values on the basis of a bit string of the second pseudo-random number;

a matrix generating section configured to generate a matrix in which pixel values based on constituent bit values of the first pseudo-random number are set at matrix positions designated on the basis of the matrix address candidate values; and an encoding section configured to generate encoded data by executing exclusive OR operations between corresponding positional data in the matrix generated by the matrix generating section and the received input data.

* * * * *